United States Patent
May

(10) Patent No.: US 7,117,752 B2
(45) Date of Patent: Oct. 10, 2006

(54) PULSED TORQUE MEASUREMENT

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 76 days.

(21) Appl. No.: 10/373,636

(22) Filed: Feb. 24, 2003

(65) Prior Publication Data

US 2004/0040391 A1     Mar. 4, 2004

(51) Int. Cl.
    *G01L 3/02*      (2006.01)
(52) U.S. Cl. ................................. 73/862.331
(58) Field of Classification Search ..............
                                73/862.31–862.339
See application file for complete search history.

(56) References Cited

U.S. PATENT DOCUMENTS

| | | | | | |
|---|---|---|---|---|---|
| 4,455,514 | A | * | 6/1984 | Ohno | 318/254 |
| 4,627,298 | A | * | 12/1986 | Sahashi et al. | 73/862.336 |
| 5,351,555 | A | | 10/1994 | Garshelis | 73/862 |
| 5,522,269 | A | * | 6/1996 | Takeda et al. | 73/862.333 |
| 6,553,847 | B1 | * | 4/2003 | Garshelis | 73/862.336 |
| 6,698,299 | B1 | * | 3/2004 | Cripe | 73/862.331 |
| 2001/0045785 | A1 | * | 11/2001 | Chen et al. | 310/104 |
| 2004/0007083 | A1 | * | 1/2004 | Viola et al. | 73/862.335 |

FOREIGN PATENT DOCUMENTS

| | | |
|---|---|---|
| EP | 0 321 662 B1 | 2/1994 |
| WO | WO 99/56099 | 11/1999 |
| WO | WO 01/13081 A1 | 2/2001 |
| WO | WO 01/27584 A1 | 4/2001 |
| WO | WO 01/79801 A2 | 10/2001 |
| WO | WO 01/79801 A3 | 10/2001 |

* cited by examiner

*Primary Examiner*—Max Noori
(74) *Attorney, Agent, or Firm*—Blank Rome LLP

(57) ABSTRACT

A method of measuring torque in a part, for example a shaft, in which at least one coil, wound about an axis of the part about which axis torque is applied, is A.C. energized to create an alternating polarity magnetic field in the part, which field emanates a component dependent on torque. A magnetic field sensor arrangement is responsive to the emanated component to produce a torque-indicating signal. The at least one coil is energized by a series of energizing pulses of current of alternating polarity which pulses have a relatively small duty cycle. The sensor arrangement produces sensor pulses of alternating polarity corresponding to said energizing pulses, and the sensor pulses are measured in a peak-to-peak fashion to produce an output signal representing torque.

54 Claims, 6 Drawing Sheets

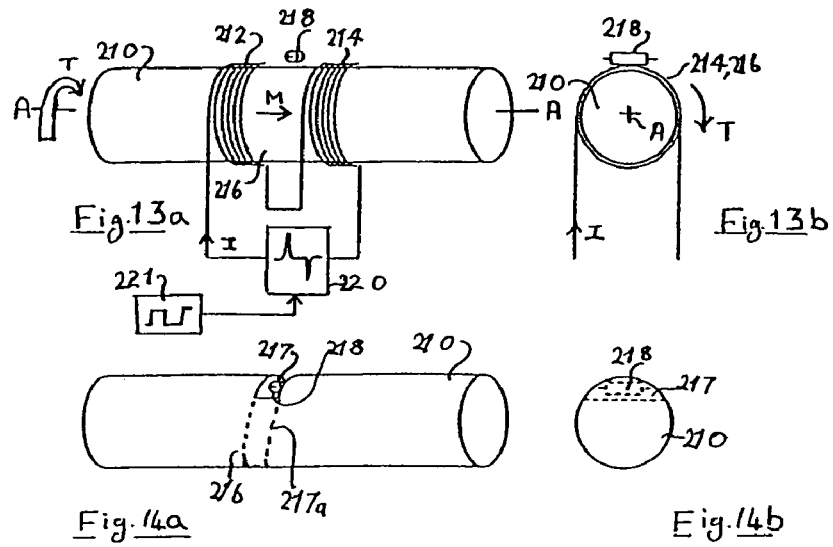
Fig. 13a  Fig. 13b
Fig. 14a  Fig. 14b
Fig. 15a
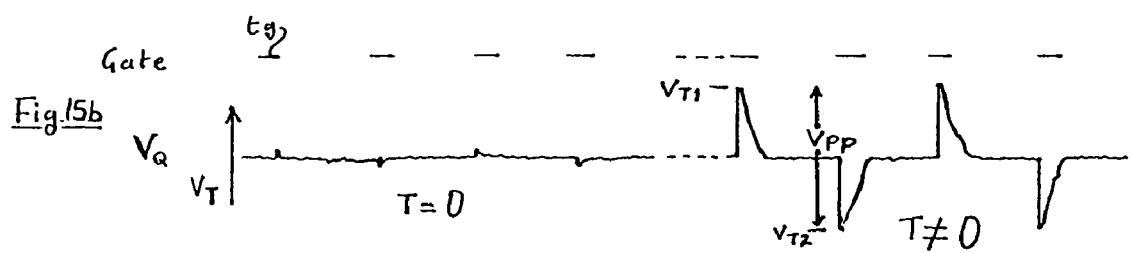
Fig. 15b

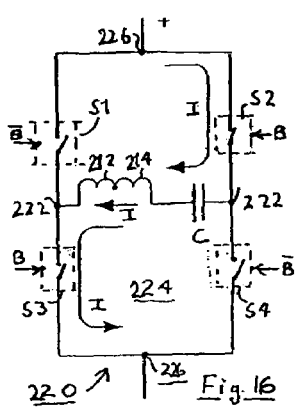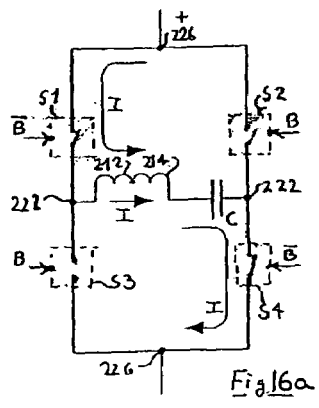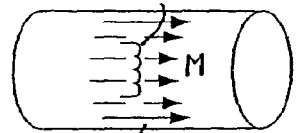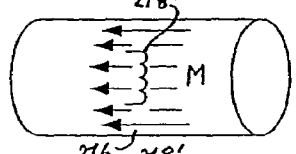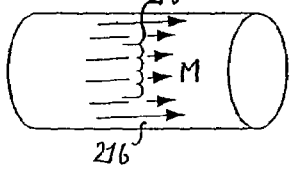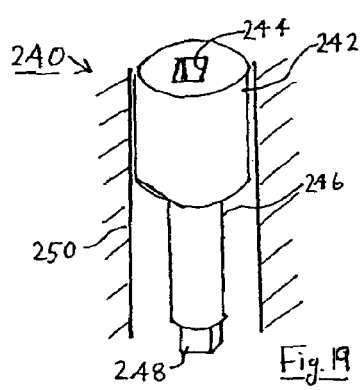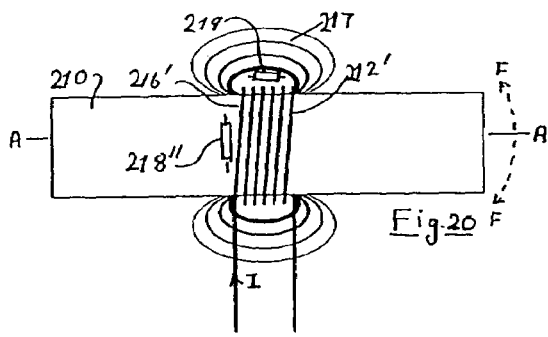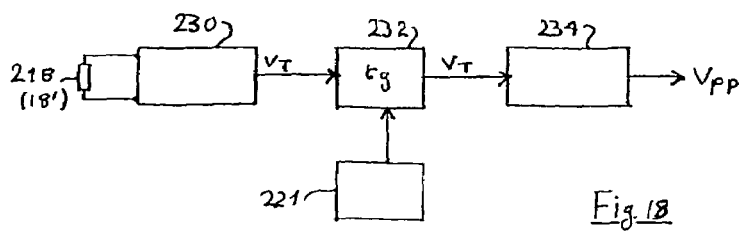

PULSED TORQUE MEASUREMENT

FIELD OF THE INVENTION

This invention relates to a method and apparatus for the measurement of torque in a part such as a shaft. The invention also relates to a method and apparatus for measuring a force which gives rise to a tilt or skew of an elongate member. The invention still further relates to a transducer assembly, in particular a magnetic-based transducer and transducer assembly.

BACKGROUND TO THE INVENTION

Magnetic transducer technology has gained wide acceptance for measuring torque in shafts or other parts for transmitting torque. Magnetic-based torque transducers have found application in non-contacting torque sensors particularly for a shaft which rotates about its longitudinal axis. One or more magnetic regions, used as one or more transducer elements, are created in or on the shaft to emanate a torque-dependent magnetic field component external to the shaft which is detected by a sensor arrangement that is not in contact with the shaft.

The following description will be given in the context of shafts but will be understood to apply to measuring torque in parts in general, unless the context otherwise requires.

One class of magnetic region used as a transducer element in torque transducers is self-excited in that it is a region of permanent or stored magnetization which emanates an external torque-dependent field. The transducer region is sometimes referred to as "encoded" in that a predetermined configuration of magnetization is stored in it.

A transducer element may be created in a region of stored or permanent (remanent) magnetization in a ferromagnetic integral region of the shaft or part. Transducer elements of this kind are disclosed in published PCT applications WO99/56099, WO01/13081 and WO01/79801. The stored magnetization may be of the kind known as circumferential in an integral region of a ferromagnetic shaft as disclosed in WO99/56099 or it may be a circumferentially magnetized ring secured to the shaft as disclosed in U.S. Pat. No. 5,351,555. Circumferential magnetization forms a closed peripheral loop about the shaft and produces an axially-directed external field in response to applied torque. Another form of stored magnetization is an integral portion of a shaft in which the stored magnetization is in an annulus about the axis of the shaft and is directed longitudinally, that is in the direction of the shaft axis. One kind of longitudinal magnetization is known as circumferential (tangential)-sensing longitudinal magnetization and is disclosed in WO01/13081; another kind is known as profile-shift longitudinal magnetization as disclosed in WO01/79801

All these forms of transducer magnetization are "D.C." magnetizations in the sense they operate with unipolar magnetic fluxes generated by the remanent magnetism stored in permanent magnets.

The sensor devices used with self-excited transducer elements may be of the Hall effect, magnetoresistive or saturating core type. These sensor-devices are sensitive to orientation. They have an axis of maximum response, and an orthogonal axis of minimum response.

Another class of magnetic transducer region is externally excited by an energized coil wound about the region. One form of externally-excited transducer is the transformer type in which the region couples an excitation winding to a detector winding, the coupling being torque-dependent. For example the permeability of the transducer element may be torque dependent. The transformer-type of transducer is A.C. energized. An example of a transformer-type of transducer is disclosed in EP-A-0321662 in which the transducer regions are specially prepared to have a desired magnetic anisotrophy at the surface.

Under conditions of severe mechanical stress where the torque transmission is subject to blows, impacts or other sharp pulses, the stored magnetization may deteriorate and the transducer operation become unsatisfactory. In addition the torque measurement may need to be done in circumstances where there are interference magnetic fields of a largely unknown and unpredictable type. Such fields are likely to arise in production plants and such like environments. Magnetic field, interference can arise from unipolar fields, noise spikes and "A.C." fields at the local powerline frequency, among others.

Another form of externally-excited transducer element is disclosed in WOO/127584 in which the magnetization of a region of a shaft arises from energization of one or more coils that are mounted coaxially with a shaft in which an applied torque is to be measured. The coils are axially spaced and define a transducer region therebetween. The coils are connected in series to generate magnetic fields in the same direction in the transducer region between the coils. The coils are energized to induce a longitudinal magnetic field of a given polarity. The longitudinal field in the transducer region is deflected in direction and to an extent dependent on torque applied to the shaft to produce an external circumferential (tangential) magnetic field component that is a function of torque. The axially-directed component of the field is separately detected to provide a reference against which the circumferential component is measured. If the coils are D.C. energized the resultant magnetic field may be interfered with by other local fields, e.g. fields extending along the shaft whose torque is to be measured.

In the torque measurement system disclosed in WO01/27584, the pair of spaced coils is A.C. energized at a frequency selected to be distinguishable from noise frequencies, e.g. mains power frequency, and the sensor output is also detected in a frequency-selective manner. The torque-dependent "A.C." or alternating polarity (AP) magnetic field component is detected. By using A.C. energization interfering D.C. fields can be discriminated against and the A.C. frequency can be selected to discriminate against interference as the local power line or supply frequency, e.g. 50 or 60 Hz. The detection may be synchronous with the A.C. energization. The external field to be sensed is enhanced by a pair of spaced collars of magnetic material attached to the transducer region to aid the establishing in a recess between the collars of an external component of the longitudinal field in the transducer region. A sensor arrangement responsive to a torque-dependent magnetic field in the circumferential (tangential) arrangement is disposed in the recess.

The just-described transducer has the advantage that the transducer region does not have to be encoded with a stored magnetization. Nonetheless a transducer region has to be defined between a pair of spaced coils. It would be advantageous to provide a transducer assembly in which no encoding is required and which could be realized in compact form and installed at any convenient location on a shaft or other part subject to torque.

The prior art also discloses various magnetic field sensor arrangements using two or more sensor devices to compensate for potential measurement errors and to assist in nullifying the effects of interfering fields. Although small, such sensor arrangements may be difficult to accommodate in situations where space is at a premium.

SUMMARY OF THE INVENTION

The present invention seeks to provide a technique which affords a magnetic-based transducer greater immunity from interfering fields. It also can be implemented in a compact form using a single sensor device for detecting a torque-dependent magnetic field component. To this end a transducer element has a torque-dependent field created therein by energization of a pair of spaced coils or a single coil. The transducer region is subjected to short duration magnetic pulses of alternating polarity and a differential measurement is made on these pulses—as detected by a sensor arrangement. Specifically the differential measurement is a peak-to-peak measurement. Such a measurement can be satisfactorily realized with the aid of a single sensor device acting at a single location.

As will be explained hereinafter, the present invention can be implemented in hostile environments such as those subject to shocks and where interference fields of an unpredictable nature may occur.

Aspects and features of this invention are set forth in the claims following this description.

One aspect of the present invention has arisen out of the consideration that if a coil is placed about a ferromagnetic shaft subject to torque and the coil energized with current, a magnetic field will be induced, at least in an annular zone of the shaft adjacent the surface. This field will be generally axially-directed. Such a field in the region of the shaft where the coil is located is distorted by a torque to generate a magnetic field component in the circumferential (tangential) direction whose magnitude and direction are dependent on the magnitude and direction of the torque. Although the magnetic field is primarily generated in the shaft region within the coil, sufficient external field exhibiting the desired torque-dependent characteristic is found closely adjacent each end of the coil and can be detected by a sensor located close in to the coil. The external diameter of the shaft should be a close match to the internal diameter of the coil, which may be supported on a former, enabling the field generated by the coil to penetrate the shaft while allowing the shaft to rotate within the coil. In addition a second sensor can be located to detect a field component generated by the coil such as a longitudinal or axially-directed component, which is unaffected or substantially so, by torque. The signal from the second sensor can be used to develop a reference signal against which the torque-dependent field component is measured.

Another aspect of the present invention has arisen out of the consideration that if a coil is placed about a ferromagnetic elongate member subject to a force transverse to the axis of the member and the coil is energized with current, a magnetic field will be induced, at least in an annular zone of the shaft adjacent the surface. This field will be generally axially-directed. Such a field in the region of the member where the coil is located is distorted by a transverse force applied to the elongate member, the force acting to tilt or skew the axis of the elongate member relative that of the coil. The force results in the generation of a magnetic field component in the circumferential (tangential) direction whose magnitude and direction are dependent on the magnitude and direction of the tilt or skew and thus of the force which gave rise to it Although the magnetic field is primarily generated in the region of the elongate member within the coil, sufficient external field exhibiting the desired-force dependent characteristic is found closely adjacent each end of the coil and can be detected by a sensor located close in to the coil. The external cross-section of the elongate member should be a sufficiently close match to the internal cross-section of the coil, which may be supported on a former, to enable the field generated by the coil to penetrate the shaft while allowing the elongate member to tilt or skew (flex) within the coil. The elongate member may be subject to a bending moment due to an applied force. Alternatively it could be pivotally mounted to allow angular displacement about the pivot in response to an applied force. In addition a second sensor can be located to detect a field component generated by the coil, such as a longitudinal or axially-directed component, which is unaffected, or substantially so, by the force being measured. The signal from the second sensor can be used to develop a reference signal against which the force-dependent field component is measured.

The invention and its practice will be further described with reference to the accompanying drawings.

BRIEF DESCRIPTION OF THE DRAWINGS

FIG. 13a shows a perspective view of a transducer assembly of a transducer element and sensor device embodying the invention applied to a shaft, FIG. 13b shows an end view of the shaft and transducer assembly of FIG. 13a;

FIGS. 14a and 14b show perspective and end views of a modification to the shaft to house the sensor device within the profile of the shaft;

FIG. 15a illustrates a bipolar pulse drive current waveform for the coils of the transducer assembly;

FIG. 15b illustrates an output waveform representing the torque-dependent magnetic field component as detected by the sensor device;

FIG. 16 shows a drive circuit in which the transducer energizing coils are connected, the circuit being in one half-cycle of operation;

FIG. 16a shows the drive circuit the next half-cycle of operation;

FIGS. 17a–17d shows the magnetic field in the transducer region of the shaft in successive half-cycles of operation for no-torque and torque conditions respectively;

FIG. 18 is a block diagram of a signal processing circuit for the sensor device signals;

FIG. 19 illustrates an application of the invention in a torque wrench adaptor, and FIG. 20 shows a modification of the transducer assembly of the invention using a single energizing coil.

DESCRIPTION OF THE PREFERRED EMBODIMENTS

Torque Measurement

Figure 1:
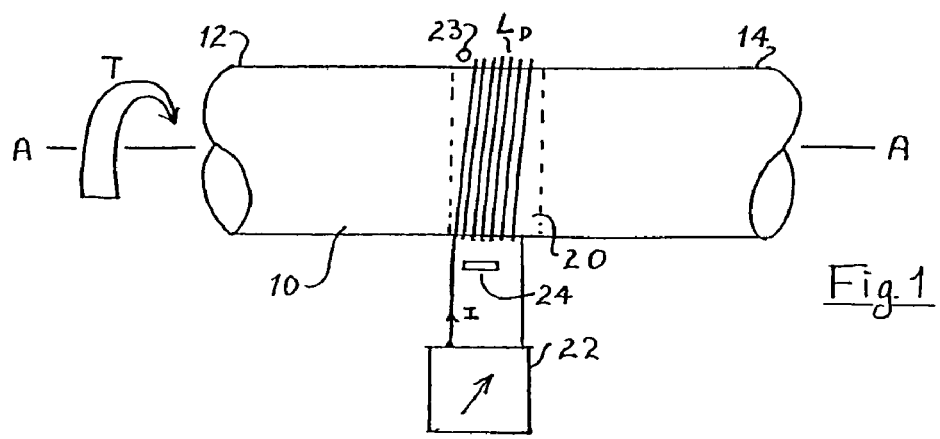
FIG. 1 schematically shows a shaft to which is mounted a transducer assembly.

FIG. 1 shows a shaft 10, which is assumed to be of circular cross-section and which is mounted for rotation about its longitudinal axis A—A. The shaft may continuously rotate, rotate over a limited angular range, or even be held at one end while torque is applied at the other. Torque T is shown as applied at end 12 to drive a load (not shown) coupled to end 14.

A coil L.sub.D is mounted about a region 20 of the shaft which is to act as a transducer region for measuring torque in the shaft. At least the transducer region of the shaft is of ferromagnetic material. The transducer region should have an axial length sufficient for the establishment of the desired field within the material of the shaft and allowing for axial displacement of the shaft with respect to the coil as may occur in some practical applications. The region 20 is indicated by the dash lines which are notional limits. The coil L.sub.D is a helical coil, single or multi-layer, coaxial with shaft axis A or it may be pile wound on a former. The coil is energized by a source 22 about which more is said below. At least one sensor device 23 is mounted closely adjacent the coil L.sub.D and region 20, that is the device 23 is closely adjacent the axial hollow in the coil in which the shaft is received. The device 23 is oriented to have its axis of maximum sensitivity in a tangential or circumferential direction at least one sensor device 24 is mounted adjacent the coil to have its axis of maximum sensitivity in the axial or longitudinal direction. The functions of sensors 23 and 24 correspond to the sensors 23 and 24 respectively seen in FIG. 8a of WO/27584. The sensors may be of the Hall-effect or magnetoresistive type but preferably are of the saturating core type connected in a signal-conditioning circuit such as disclosed in published PCT application WO98/52063. The saturating core sensors have a figure-of-eight response the maximum of which is along the core axis and the minimum of which is perpendicular to this axis. The three-dimensional response is the rotation of the figure-of-eight about the axis of maximum sensitivity. The source 22 which energizes the coil L.sub.D may be D.C. or A.C. as discussed more fully below. Preferably the source is adjustable to control the level of energization of coil L.sub.D.

Figure 2:
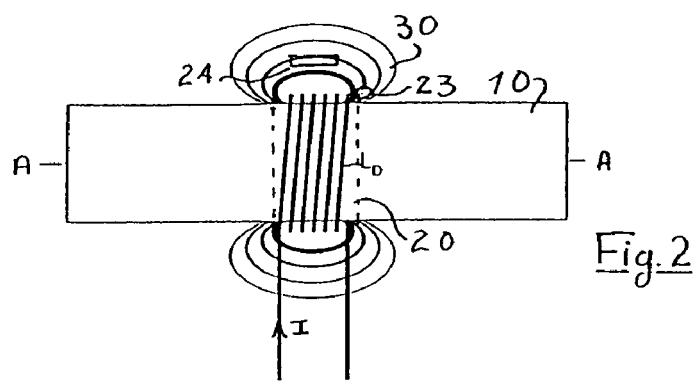
FIG. 2 illustrates the detectable external magnetic field generated by the energized coil of the assembly of FIG. 1.

WO01/27584 discloses in FIG. 8a thereof, how a longitudinal field is generated between two spaced coils wound about a shaft. The transducer region is in the zone between the two coils. In contrast, in the embodiment of FIG. 1 the transducer region lies within and extends somewhat beyond the excitation coil L.sub.D. FIG. 2 shows the general form of the external field 30 generated by a current I applied in coil L.sub.D. It extends in an annulus about axis A—A. It will extend in an annulus of axially-directed magnetization (longitudinal magnetization) within the transducer region 20 The annulus extends inwardly from the shaft surface. The internal field is not shown in FIG. 2. For best results the coil L.sub.D should couple as closely as possible to the ferromagnetic transducer region 20. The coil may be wound on a former that closely fits over the shaft 10, while allowing rotation of the shaft within the former. It has been found that the field 30 close in to the coil L.sub.D and closely adjacent the region 20 is torque-sensitive and provides a tangentially-directed component under torque whose polarity and magnitude are dependent on the direction and magnitude of the torque applied about axis A—A The sensor 23 is positioned to be responsive to this tangentially-directed component. The sensor 24 is positioned to provide a signal representing the overall level of field generated by coil L.sub.D preferably an axial component that is substantially unaffected by torque.

Figures 3A, 3B:
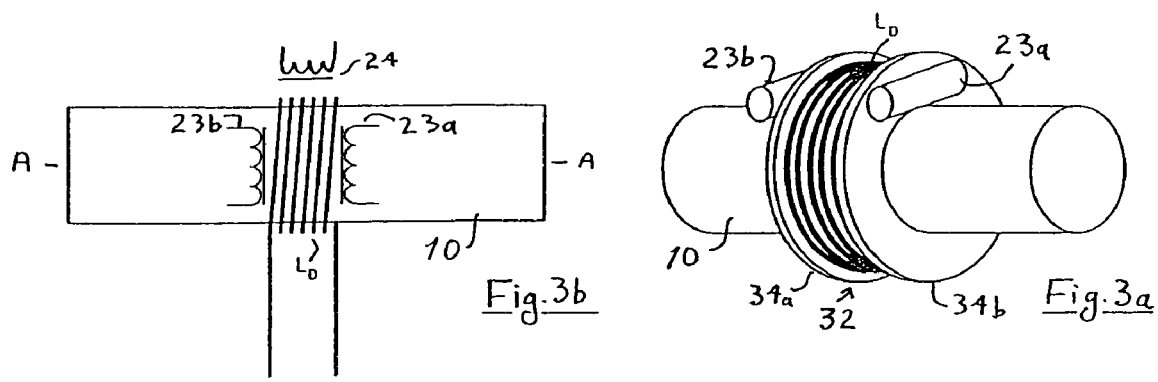
FIG. 3a shows a perspective view of a transducer comprising a unitary transducer assembly mounted on a shaft with a sensor device at each side of the coil.
FIG. 3b is a schematic illustration of the transducer of FIG. 3a with the addition of a reference sensor device.

FIG. 3a shows a perspective view of a shaft 10 on which is mounted a close-fitting former 32 on which the coil L.sub.D Is wound. The former 32 has end cheeks 34a and 34b closely adjacent to which and the shaft surface are mounted sensor devices 23a and 23b with their axes of maximum sensitivity tangential to the shaft. The arrangement is shown schematically in FIG. 3b in which the devices 23a and 23b are represented as inductances wound on saturating cores. As already indicated, the coil 24 can be mounted in the vicinity of the coil L.sub.D at any point where there is an axially-directed field component from which a reference signal can be generated against which the torque-dependent signals from sensors 23a, 23b can be measured or, put another way, which is used to control the gain of the transducer.

Figure 4:
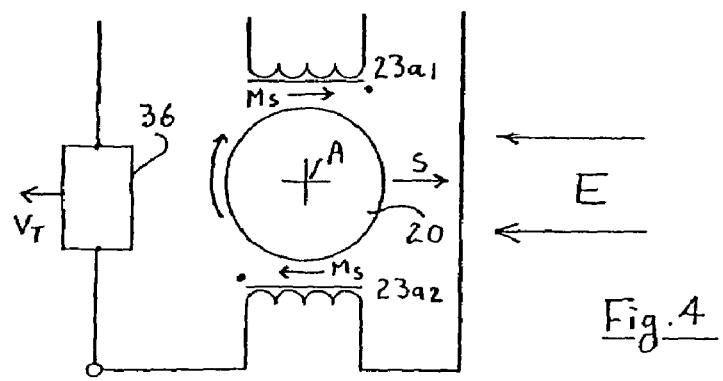
FIG. 4 illustrates a sensor arrangement with two inductive-type sensor devices (saturating core sensors) arranged to provide cancellation of an extraneous field.

FIG. 4 shows how each sensor device 23a, 23b can be provided as a sensor arrangement comprising a pair of radially-opposite sensor devices. FIG. 4 shows a cross-section through transducer region 20 and shows the sensor device 23a as now being a sensor arrangement comprising a pair of devices 23a1 and 23a2 mounted on opposite sides of the transducer region 20 of shaft 10, i.e. diametrically opposed with respect to axis A—A. The remainder of the transducer assembly is not illustrated. In the cross-sectional view of FIG. 4 the torque-dependent field components are denoted Ms and are oppositely directed on diametrically opposite sides of region 20 so that the respective device coils 23a1 and 23a2 are connected in series additively as regards the torque-dependent components Ms but are connected subtractively to cancel an external field E acting on both sensor devices in common. The sensor devices 23a1 and 23a2 are connected in series to a signal-conditioner circuit 36 from which is obtained a torque-representing output signal, V.sub.T.

The shaft 10 may be subject to a bending moment causing a deflection of it at the transducer region 20 from the axis A—A. The shaft may also be subject to some wobble of its axis in its rotation. If the shaft deflects perpendicularly to the direction of arrow s, that is toward one of the sensor devices and away from the other, the one device will provide a larger signal output than does the other. Because the outputs are additively connected, such a deflection will be compensated, at least to some extent. The compensation is not exact because the field strength sensed by the devices is a square law function of distance from the shaft surface. But normally such deflections are expected to be small and a high degree of compensation is afforded.

If the deflection is in the direction of (or opposite to) the arrow s, provided that it is small and within the lateral sensing extent of the sensor devices i.e. not resolvable by the devices, the combined signal output will not be affected. As the deflection increases, each sensor device $23a1$, $23a2$ yields a lesser torque signal output. However, there is also a signal generated in each device due to the deflection itself even if the shaft is not rotating. The deflection is a common mode effect and is cancelled by the connection of the two devices. This subject is: further discussed below with particular reference to FIG. 7.

Figure 5:
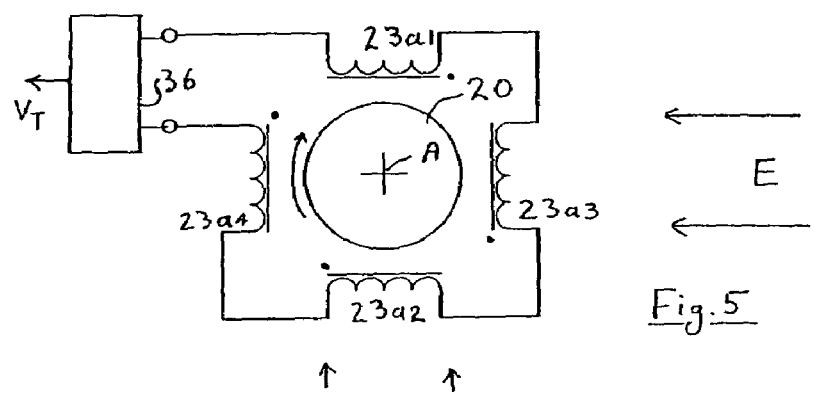
FIG. 5 shows a sensor arrangement of four sensors providing cancellation of extraneous fields.

The sensor arrangement disposed adjacent one end of the coil $L_D$ can be extended further. For example FIG. 5 shows an additional pair of sensor devices $23a3$ and $23a4$ mounted diametrically radially opposite one another with respect to transducer region 20 and orthogonally with respect to devices $23a1$ and $23a2$. Devices $23a1$ and $23a2$ are additively connected with one another, and with devices $23a1$ and $23a2$ as regards the torque-dependent field components but are subtractively connected with respect to a magnetic field component E'.

It will be appreciated that the same use of one or more pairs of sensor devices can be adopted for sensor device 23*b* of FIGS. 3*a* and 3*b*. It will also be noted that it is not necessary for the sensor devices 23*a* and 23*b*, or the more complex sensor arrangements thereof, to be aligned in angular disposition about the shaft. It will be also appreciated that each sensor device can be connected into a respective detection circuit and the outputs of the individual circuits combined as required.

Figure 6:
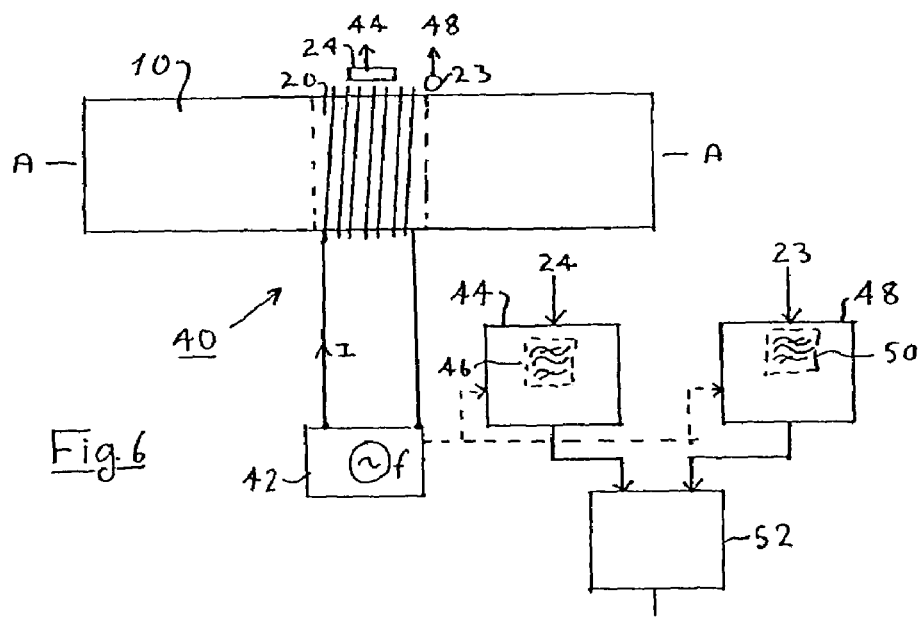
FIG. 6 schematically shows an A.C. energized transducer system.

The description of the practice thus far has assumed a D.C. energization of the coil. This leads to what may be called a D.C. magnetic field. For reliability of response in using a D.C. field, it is desirable that the shaft 10 be subject to a de-gaussing or magnetic cleansing procedure as is described in above-mentioned WO01/79801. In the sensor arrangements discussed above, the adoption of a D.C. magnetic field leads to the fastest torque-signal response with the circuitry currently in use. That is the overall circuitry exhibits the highest bandwidth for signal changes. However, A.C. magnetization may also be employed A.C. energization has some advantages but also entails consideration of other factors. An A.C. transducer system 40 is illustrated in FIG. 6 and may be compared to that shown in FIG. 12 of WO01/27584. An A.C. source 42 energizes coil $L_D$ at a frequency f. The source may be a bipolar pulse source. A signal conditioner circuit 44 connected to sensor arrangement 24 is provided with a filter function 46 to extract the magnetic field component at frequency f detected by sensor arrangement 24. The filter may be driven from the source 42 to ensure the filter 46 tracks the source frequency f as is indicated by the chain line. Synchronous detection in which a detector in circuit 44 is driven by a signal from source 42 may be employed. Similarly the sensor arrangement 23 is connected into a frequency-selective signal conditioner circuit 48 including filter function 50 to provide an output representing the torque-dependent field component. This component together with a reference level component obtained from circuit 44 is applied to a signal processing circuit 52 from which a torque-representing output $V_T$ is obtained. It will be understood that the filtering and signal-processing functions may be performed in hardware or software and that the filtering may be performed at various points in the complete signal path. It is desirable that the operating frequency of the source/filter system be selected to be well-distinguishable from frequencies of potential interfering sources, e.g. power (mains) frequency.

Saturating core types of sensor are capable of operating up to 10 kHz or more but in addition to the sensor response consideration has to be given to the source frequency response in its ability to drive the coil $L_D$. There is another frequency-dependent characteristic to be considered, particularly when the transducer region is an integral portion of a shaft.

The depth of penetration of the coil field into the material of the transducer region is frequency-dependent. It is greatest at zero frequency, i.e. D.C., and decreases as the drive frequency increases. For example, a shaft of FV250B steel of a diameter of 18 mm, was penetrated entirely by a D.C. energized coil but was not entirely penetrated by the equivalent A.C. current at 100 Hz. Penetration of the entire cross-section of the transducer region is not essential as the torque-dependent response tends to be concentrated in a surface-adjacent annular zone. However, as the frequency increases it is found that the gain or slope of the transfer function—the torque-dependent signal output v. applied torque—will have a tendency to decrease.

The transducer and transducer assembly described above provides the following benefits:

the assembly of coil (with former) and sensor arrangement or arrangements can be manufactured as a unitary component mountable to a shaft; the unitary structure may also comprise signal conditioning and processing circuitry;

the manufacturing process does not require any encoding procedure for the transducer region to establish a permanent magnetization therein; in a homogeneous shaft, there is freedom as to where the transducer region is to be established and there is no critical aligning of the transducer assembly with a predetermined region of the shaft.

there is no degradation of the magnetization of the transducer region overtime as can occur with a permanent magnetization;

the gain or slope of the transfer function of the transducer is a function of the drive current to the transducer coil. It has been found that short of energization current levels creating a non-linear response, response sensitivities are obtainable substantially greater than achievable by the aforementioned profile-shift magnetization;

the transducer is insensitive to axial displacement of the transducer region with respect to the transducer coil/sensor assembly;

the ability to operate in an A.C. fashion at, a selected frequency allows operation within a noisy environment and renders the transducer more tolerant of stray magnetisms in the shaft.

Figure 7:
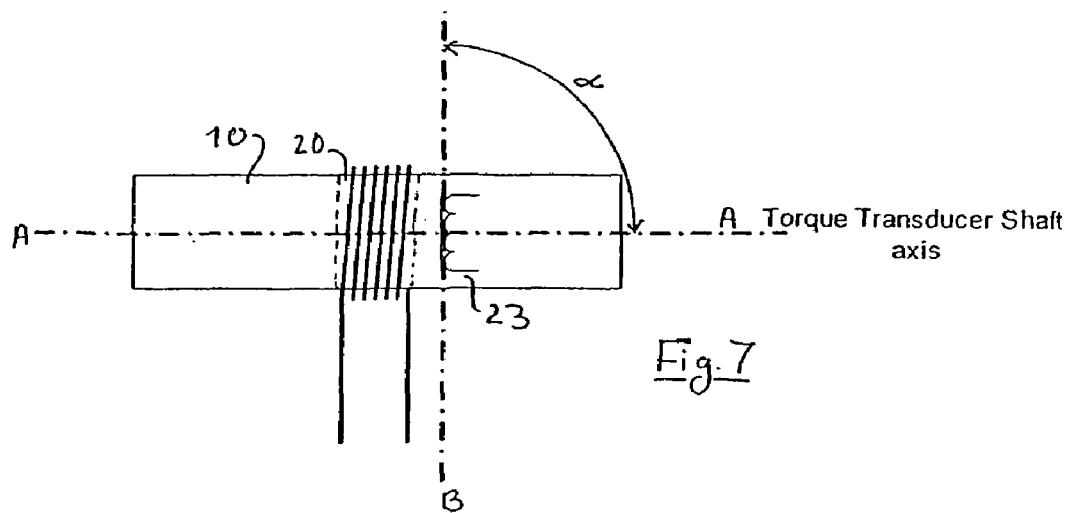
FIG. 7 illustrates factors to be considered relating to movement of the shaft relative to the transducer assembly.

Another factor to be considered for both D.C. and A.C. implementations is illustrated in FIG. 7 which shows the shaft 10, energizing coil L and a sensor device 23 oriented to detect a tangential torque-dependent component. The axis B—B maximum sensitivity of a sensor device 23 is oriented at an angle of a to the axis A—A of the shaft. Axis A—A lies in the plane of the figure, axis B—B is parallel to and above the plane of the figure. Angle .alpha. is thus the angle between axis B—B as projected onto the plane of the figure and is ideally 90.degree. As compared to some forms of permanently magnetized transducer regions, the transducer assembly described above is not sensitive to axial shifts of the transducer region, assuming the transducer region is bounded by shaft material homogeneous therewith as would be the case with a shaft homogeneous along its length with which the transducer region is integral. However, the operation of the transducer assembly (coil plus sensor arrangement) is sensitive to axial skewing or tilting of the shaft relative to the assembly that affects the angle $\alpha$.

Attention will now be given to the sensitivity to axial skewing and measures to mitigate it. It will also be shown that conversely a transducer-assembly described above can be implemented to use axial skewing in an advantageous manner to enable a measurement of a force to be made.

Referring again to FIG. 7, consider the situation where there is no torque in the shaft 10 but the shaft axis tilts relative to the axis of coil $L_D$ So that the angle $\alpha$. is no longer 90.degree. The coil is energized.

The result is a transverse component of the magnetic field generated by the coil $L_D$ which is detected by sensor device 23. If a sensor arrangement such as shown in FIG. 4 is employed the skewing, indicated by arrow S, will be in the same direction relative to both sensors $23a1$ and $23a2$. As regards the detected field, the skew acts as a common mode component and is cancelled in the output similarly to the common external field E. This common mode rejection is equally obtained when the shaft is under torque. When under torque as knew orthogonal to arrows will tend to increase the component $M_s$ at, say, sensor device $23a1$ and decrease component $M_s$ at sensor $23a2$ with little effect on the combined output signal $V_T$. This is true generally of wobble of the shaft 10 in its rotation. This foregoing reasoning can be extended to the sensor arrangement of FIG. 5 with reference to a skew orthogonal to direction S.

Figure 8:
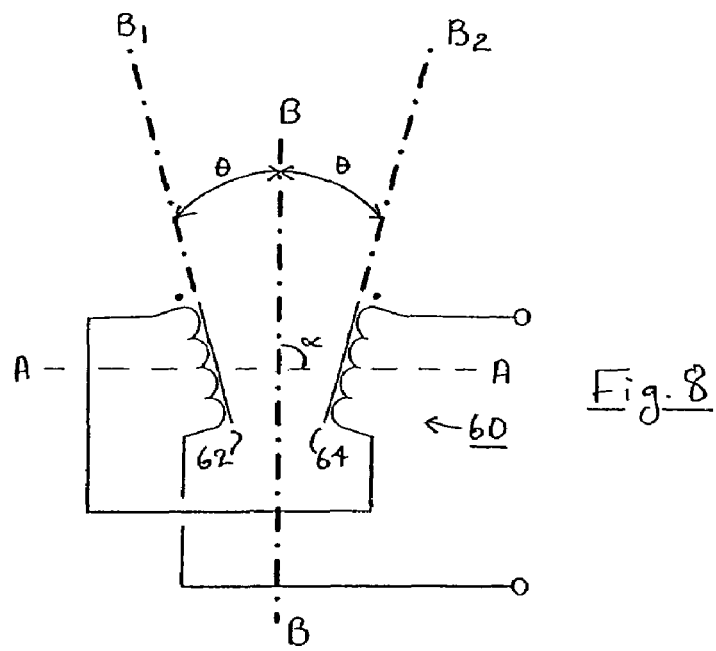
FIG. 8 illustrates one sensor arrangement for reducing the sensitivity to axial skew or tilt of the transducer assembly relative to the axis of the transducer region.

Another approach can be adopted to making an individual sensor such as 23 in FIG. 7 less sensitive to skew. This is illustrated in FIG. 8 in which the single sensor device 23 is shown as being replaced by a sensor unit 60 comprising a pair of devices 62 and 64. The shaft as such is not shown but its axis A—A is indicated. B—B is the axis of response of sensor 60, desirably at an angle $\alpha.=90.$degree. to axis A—A. the two sensor devices are offset at an angle $\theta$. to each side of axis B—B, that is their respective axes $B_1$, $B_2$ maximum sensitivity are separated in a "V" formation by angle $2\theta$.

In measuring a torque-dependent field component, which affects both sensor devices substantially equally, if there is a tilt—$\alpha$ moves from 90.degree.—the field sensed by one device increases while the field sensed by the other decreases. If the two devices are connected additively, dot to non-dot end, the resultant signal is far less affected by angular skew or tilting than that of a single device, particularly for small deviations of a from 90.degree. This would normally be the case. The angle of deviation should not exceed the angle $\theta$.

Force Measurement

The immediately preceding discussion has been concerned with measuring torque in the presence of an angular tilt or skew of the shaft relative to the transducer coil assembly and its associated sensors. One circumstance in which such a skew or tilt may arise is if the shaft, the torque in which is to be measured, is subject to a transverse force leading to a bending moment in the shaft at the location of the transducer region. The sensitivity to any resultant axial tilt or skew, in the absence of compensatory measures, can be utilized to measure the applied force. Furthermore, this force measurement is not restricted in its application to a shaft in which a torque is transmitted. The force measurement can be applied to any elongate member subject to a bending moment due to an applied force or even an elongate member pivotally mounted to turn about the pivot axis in response to an applied force. The elongate member is tot be capable of supporting or having incorporated into it a transducer region with a transducer assembly as has been described above but with a modified sensor arrangement.

Figure 9:
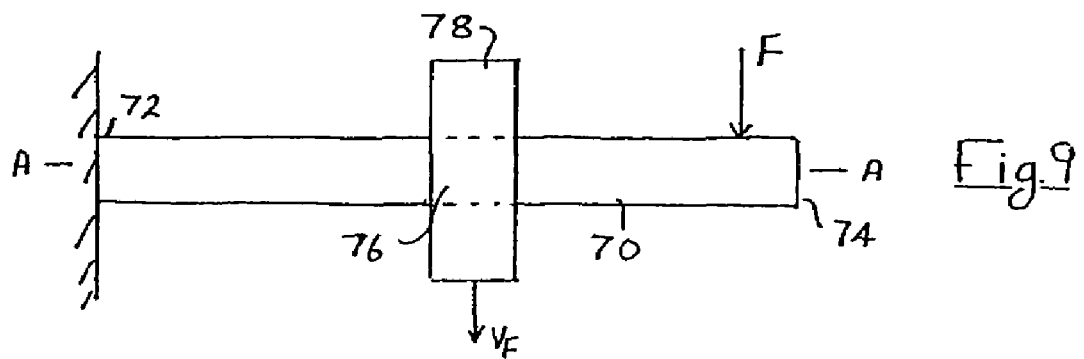
FIG. 9 illustrates one embodiment using a transducer in the measurement of a force by utilizing the sensitivity to tilt or skew.

FIG. 9 shows an elongate member 70 which is fixed at one end 72 and the other end portion 74 of which is free to move under a force F applied transversely of a longitudinal axis A—A of member 70. The member 70 is resilient and relatively stiff so that it yields to the bending moment impressed by the force F to deflect at an intermediate region 76 to an extent which is function of the applied force. The intermediate region 76, at least, is of ferromagnetic material and provides a transducer region for a transducer assembly 78 comprising an excitation coil about region 76 and a sensor arrangement configured to respond to the deflection of the member 70 with respect to the axis of the coil of transducer assembly which remains aligned with the axis A—A of the unstressed member 70 with no force F applied to it. The transducer assembly is constructed as previously described and with particular reference to the detection of tilt or skew. The effect of the deflection of the elongate member is that of the angular tilt or skew already described, where the shaft 10 is no longer a torque transmitting part but is now replaced by the deflectable elongate member 70.

By way of example, if the sensor arrangement in assembly 78 of FIG. 9 uses a pair of diametrically opposite sensor devices as shown in FIG. 4, consider a connection of the sensor devices $23a1$ and $23a2$ to circuit 36 in which one of the devices is now reverse connected, e.g. dot end to dot end, the connection does not cancel the skew or tilt S due to force F in FIG. 9 but adds the contributions from the sensor devices due to S to provide the force-representing signal $V_F$ in FIG. 9 If the circumstances were such that it was desired to measure the skew or tilt S of the shaft 10 without interference by the torque in the shaft, it will be seen that the reversal of the connection of the sensor devices $23a1$ and $23a2$ in FIG. 4 not only provides an additive response to skew or tilt but cancels the torque components $M_s$.

A transducer assembly 78 of FIG. 9 having the coil arrangement of FIG. 8 can be also adapted to measure the force dependent deflection of member 70 by reversing the connection of one sensor device so that the devices 62 and 64 are, for example, connected dot end to dot end. The output now obtained represents the tilt angle $\theta$.

Figure 10:
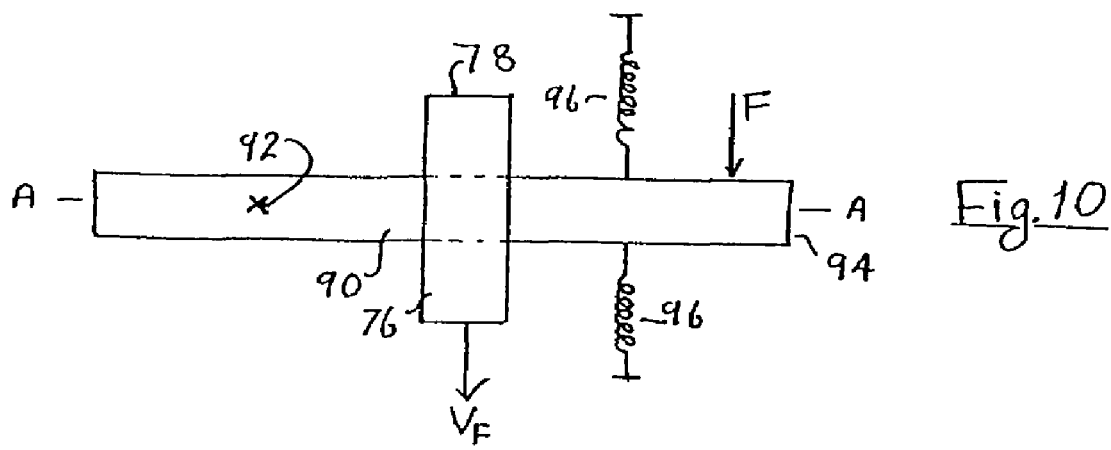
FIG. 10 illustrates a second embodiment for the measurement of a force.

While FIG. 9 shows the use of an elongate member the resilience of which resists the applied force F and the resultant bending moment in which causes the measurable skew or tilt, the equivalent result could be achieved by the modification shown in FIG. 10 in which an arm 90 pivotally mounted at 92 to pivot in the plane of the figure has the force F to be measured applied at its free end 94. The force is resisted by resilient means 96, such as a spring or a magnetic-force restoring means which is particularly usable where the whole arm 90 is of ferromagnetic material. With zero force F applied the axis A—A of the arm 90 is aligned with the axis of the transducer assembly constructed as described above to provide the force-representing signal $V_F$.

Figure 11:
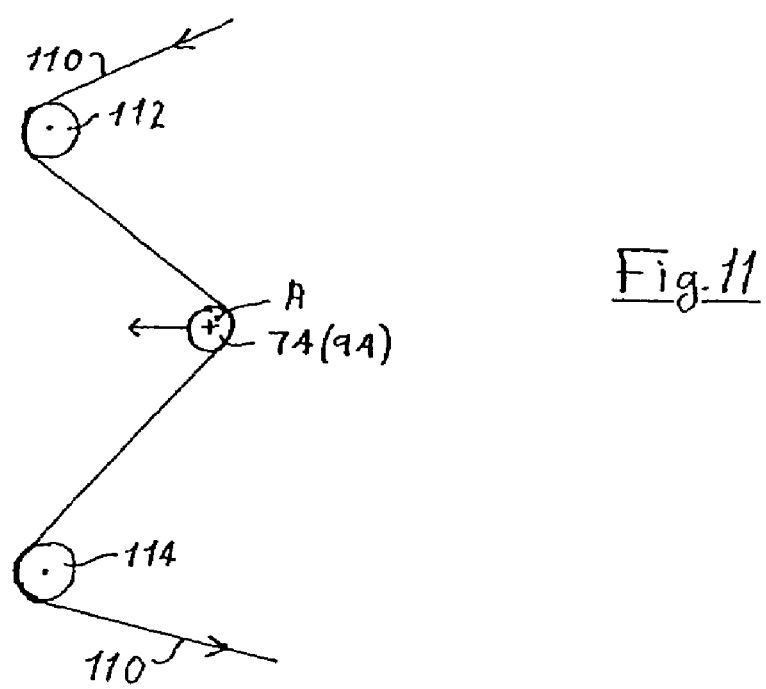
FIG. 11 shows an implementation of the force-measuring embodiment of FIG. 9 or 10 in measuring tension in a running thread or other similar lengthwise-moving flexible item.

An example of the application of the above described transducers and transducer assemblies to the measurement of a force or bending moment is illustrated in FIG. 11. This figure illustrates a system for measuring the tension in a running thread such as found in a weaving or other textile machine. The system employs a force measurement transducer as shown in FIG. 9 or FIG. 10.

In FIG. 11 the thread 110 moves in a path over pulleys or rollers 112 and 114 between which the path is angled into a V-shape by the offset introduced by the end portion 74 (94)

of the elongate member 70 (90) of FIG. 9 (10) which is mounted to have its axis A—A at least substantially normal to the plane of the drawing. The end portion 74 (94) may be configured to allow free running of the thread over it. The angle introduced into the thread path by portion 74 (94) results in a force F being exerted on portion 74 (94) which is measured by the transducer of FIG. 9 (10) as described above.

Figure 12:
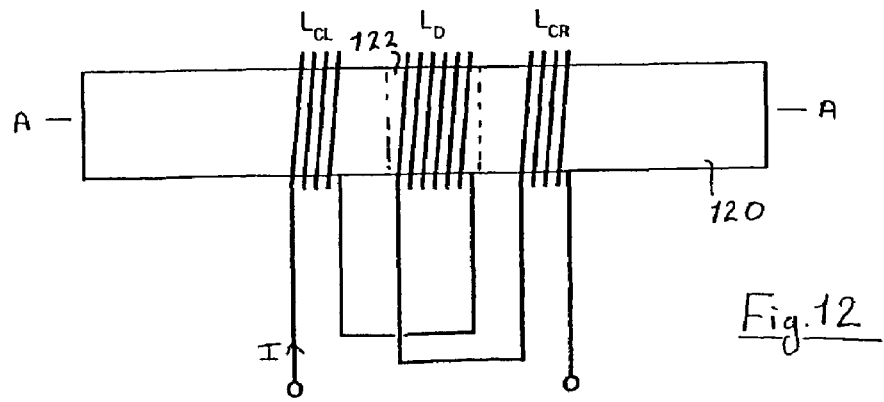
FIG. 12 shows a modification of the transducer assembly including further coils to reduce the possibility of establishing remanent magnetization in the transducer region.

FIG. 12 illustrates a modification of the embodiments of the transducers and transducer assemblies described above in which provision is made to prevent the creation of a bar magnet in the shaft or elongate member in which the transducer region is incorporated. This applies particularly to D.C. energized transducers but may also be applied to reduce the likelihood of residual magnetization occurring in A.C. energized transducers.

FIG. 12 shows a shaft or elongate member 120 on which an excitation coil $L_D$ is mounted about transducer region 122. The sensor arrangement is not shown. To each side of coil $L_D$ a respective coil $L_{CL}$ and $L_{CR}$ is mounted. The coils $L_{CL}$ and $L_{CR}$ are energized at the same time as coil $L_D$, as by being connected in series therewith as shown in FIG. 12, and generate fields of opposite polarity to that generated by coil $L_D$. The coils $L_{CL}$ and $L_{CR}$ are sufficiently spaced from coil $L_D$ to allow the desired transducer region field to be generated and sensed in the manner already described.

More specifically, each of the three coils produces an individual field as shown in FIG. 2. Taking coil $L_{CL}$ as an example the field toward coil $L_D$ is of the same polarity as that of coil $L_D$ towards coils $L_{CL}$, i.e. the fields tend to repel one another. An equivalent situation arises between coils $L_D$ and $L_{CR}$. The coils $L_{CC}$ and $L_{CR}$ should not be so close to coil $L_D$ as to adversely affect the torque-or force-dependent field which it is sought to measure. The effectiveness of the coils $L_{CL}$ and $L_{CR}$ in reducing the formation of a bar magnet in shaft or elongate member 120 may be judged by a sensor located to detect the axial field extending outwardly of a coil $L_{CL}$ or $L_{CR}$. This field should be reduced to substantially zero. Experiments have shown that such a result can be achieved by having the coils $L_{CL}$ and $L_{CR}$ generate half the ampere-turns of coils $L_D$ so that for the series connection shown with a common current, coils $L_{CL}$ and $L_{CR}$, have half the number of turns of coil $L_D$.

The shaft or elongate member in which the transducer region is created may be subject to a de-gaussing procedure prior to being put into use. Such a procedure is described in published PCT application WO01/79801.

FIGS. 13*a* and 13*b* show the physical arrangement of a torque transducer embodying the present invention. It is applied to a shaft 210 which is rotatably mounted about a longitudinal axis A—A about which a torque T is applicable The torque may be clockwise (CW) or counter-clockwise (CCW). The shaft does not necessarily have to rotate continuously or at all. The shaft 210 is assumed to be of circular section with the axis A—A being central. The shaft or at least the region of it of interest to transducer operation is of ferromagnetic material. Two coils 212 and 214 are mounted to be wound about the shaft and are energizable to induce an axially-directed (longitudinal) magnetic field in the shaft. The coils are spaced apart and define therebetween a transducer region 216 of the shaft. In the embodiment shown the coils are connected in series to receive an energization current L, the coils being connected in series in additive fashion to co-operate to generate a longitudinal magnetic field in region 216 generally indicated by arrow M. The generated field is discussed below. The direction of field M depends on the polarity of current I.

The longitudinal field M is axially-directed but is deflected by torque T acting about axis A—A in transducer region. Although the field is primarily confined within the material of the shaft, an external field component will arise which affords the possibility of detection of the field by a non-contacting sensor arrangement. The deflection under torque creates a tangential or circumferentially-directed field component whose magnitude and direction is a function of the direction and magnitude of the torque. This component can be detected by a magnetic field sensor device 218 which as shown in FIGS. 13*a* and 13*b* is tangentially oriented to be sensitive to the circumferentially-directed or tangential component. Commonly available sensor devices have an axis of a broad maximum response and a minimum response at right angles to that axis, or more specifically in a plane at normal to that axis. Magnetic field sensing devices that may be employed include Hall Effect, magnetoresistive and inductor (saturating core) types. They are available as small units. One particular device which has been satisfactorily used is the saturating core type of device connected in a signal conditioning circuit of the kind disclosed in WO98/52063. As will be explained below, a single sensor device may be used in the practice of this invention where prior magnetic transducers would have required two or more sensor devices for cancellation of an interfering magnetic field, such as the Earth's field. This assists in placing the transducer assembly in a location where space is at a premium. An example is given in FIG. 19 below.

To make the transducer more compact still, FIGS. 14*a* and 14*b* illustrate a modification to position the sensor device within the confines of the outline or profile of the shaft 210. Whereas in FIGS. 13*a* and 13*b*, the device 218 is external to the cylindrical profile of the shaft 210, in FIGS. 14*a* and 14*b*, the transducer region 216 (the coils are not shown) has a notch or recess 217 within which the sensor device 218 is received so as to be recessed within the circular outline of the shaft. The device could be received within a bore in the shaft. The modification of the housing of the sensor device 218 within the shaft profile, or substantially so, also brings an attendant advantage that the device is going to be in a stronger magnetic field.

The arrangement of FIG. 14*a* needs additional measures where the shaft 210 is to rotate continuously or is rotatable over a given arc—for example the shaft may move back and forth—with respect to a fixed sensor device 218; or where the sensor device 218 is to rotate with the shaft 210 over whatever angle is appropriate.

In the case where the sensor device is held fixed, the notch or recess 217 can be extended as far as necessary to form a groove entirely or partly around the shaft as indicated at 217*a* in FIG. 14*a*. This measure may be applied to the torque drive or adapter unit of FIG. 19 where the sensor device is fixedly mounted to the wall of housing 250. It is easier to connect the sensor device into signal processing circuitry in this case. Nonetheless it is possible to have the sensor device mounted to the shaft to rotate therewith. For example, in the embodiment of FIGS. 14*a* and 14*b* the sensor device 218 secured in the recess as shown could be connected to slip rings extending around the shaft and engaged by fixed contacts. The connections could be made to run along an axial bore in the shaft to a suitable signal pick-off point. The sensor device could be incorporated in a complete self-contained unit mounted in notch or recess 218 designed to radiate a torque-dependent signal to a separate receiver as by induction coupling (magnetic coupling) or by electromagnetic radiation or any means by which a remote communication link is established.

Reverting to FIG. 13a, there is shown a source 220 for supplying energizing current I to the series connected coils 212 and 214 It is an important feature of this invention that the energizing current waveform be bipolar pulses of low duty cycle, e.g. short duration, spiky pulses. The adoption of such a waveform leads to important operational advantages as compared, for example, to the use of a bipolar pulse waveform of essentially 100% duty cycle such as a bipolar square wave. An energizing current waveform suitable for the practice of the present invention is shown in FIG. 15a. the magnetic field pulse waveform will follow the current waveform. It will be realized that such a current waveform can be generated by differentiating a bipolar square wave. However, the precise waveform nor the means of generating it is not restricted to a differentiated bipolar square wave. It does serve, however, to indicate the nature of a short duration, spiky pulse wave of alternating polarity (AP) magnetic field pulses generated in the transducer region 216. The current pulse generating source 220 has its frequency controlled by a frequency source 221 though, of course, the two sources could be realized by a single unit. Source 221 is preferably a frequency-stable square wave source at a frequency unrelated to the local power (mains) frequency.

FIG. 16 shows a simplified circuit for the drive source 220 to which the coils 212 and 214 are connected. The coils are connected in series with a capacitor C across one diagonal 222 of a switching full-wave bridge circuit 224 to the other diagonal 226 of which a D.C. power supply is connected. Controllable switches 81-S4 in respective arms of the bridge are controlled to generate a bipolar waveform across diagonal 222 which is subject to the differentiation characteristic provided by capacitor C to generate short current pulses of low duty cycle in the series coils 212, 214 The switches S1–S4 are implemented in practice by any appropriate kind of controllable switch device, such as a semiconductor device. The switch devices have respective control inputs for receiving switching control signals B and NOT-B at a desired frequency derived from the source 221 of FIG. 13, the switch pair S1 and S4 being turned on and off alternately and inversely with switch pair S2 and S3.

FIG. 16 shows the bridge 234 in one half-cycle of operation (switches S2 and S3 on with switches 31 and S4 off). As switches S2 and S3 close, current I is driven through the bridge and the coils 212 and 214 as shown by the arrows. The capacitor C enables a high initial current pulse to pass through the coils. The capacitor charges positively at junction with S2. The circuit parameters are chosen so that the pulse is short relative to the switching period of control signals B, NOT-B. FIG. 16a indicates the generation of the current pulse of opposite polarity in the next half cycle with S1 and S4 closed and S2 and S3 open. It will be seen from this figure that the generation of the pulse involves not only the charging of the capacitor to the opposite polarity but it is preceded by the discharging of the charge acquired on the previous half cycle.

The form of the magnetic pulses in the shaft will follow the current I in the coils rather than the voltage waveform applied across diagonal 222. The exact form of the current waveform is dependent on the inductance of the coils, which resists any sudden change in current, and substantially on the ratio of the inductance to resistance. The use of a series capacitor in the current flow, and specifically placed in the diagonal in which the coils are connected, leads to two advantages, the current waveform is predominantly controlled by the capacitor C as illustrated in FIGS. 15a and 15b and it provides an effective time constant relative to the pulse period (here, the interval between a pair of alternating polarity pulses) that is short so that the current has reduced to near zero for the first pulse before the next pulse is generated. Consequently there are no switching spikes due to interruption of significant current still flowing in the coils. The capacitative circuit also assists in developing symmetrical alternating pulses, e.g. in FIG. 15b V.sub.T1, and V.sub.T2 are of equal magnitude, minimizing the possibility of building up a unipolar remanent magnetization in the shaft due to the switched waveform itself.

The pulse current levels should be chosen to provide adequate signal output and signal/noise but without tending to produce undue levels of remanent magnetization in the shaft material. This is consistent with obtaining the desired pulse waveform of FIG. 15b. The actual current level, or more specifically, the ampere-turns of field exerted on the shaft will be dependent on the size (diameter) of the shaft and the material of which it is made with particular regard to magnetic characteristics. For shafts in the range of 15–20 mm of industrial-type steels, e.g. FV250B, it is presently considered that the working emanated longitudinal field closely adjacent the shaft should not exceed about 30 Gauss.

It will be understood that the full-wave bridge 234 enables bipolar pulses to be generated from a unipolar power supply which may be of a single polarity with respect to a ground reference or a dual polarity supply.

The operation of the transducer is further demonstrated in FIGS. 17a–17d which shows the transducer region 216 with a tangentially-oriented saturating core inductor sensor device 218'. In these figures the longitudinal magnetic field M generated by the coils 212 and 214 (not shown) is indicated by multiple parallel arrows. FIGS. 17a and 17b apply to the field generated by pulses of one and other polarity respectively in the absence of torque (T=0). The field is axially-directed: there is no tangential field component to be sensed by device 218'. FIGS. 17c and 17d correspond to FIGS. 17a and 17b but in the presence of an applied torque. The field M is deflected or skewed in a direction dependent on the sense of the applied torque T and to an extent dependent on the magnitude of the torque. A resultant tangential field component is detected by sensor device 218' and a pulsed output signal V.sub.T is generated by the sensor circuitry as indicated in FIG. 15b. in synchronism the coil pulses. The output pulses are of alternating polarity and have a magnitude which is dependent on the applied torque For an applied torque of opposite sense the sense of the output pulses would likewise be reversed. The output pulse train under no torque (T=0) and torque conditions (T.noteq.0) is illustrated in FIG. 15b at the left and right respectively.

The amplitude of the individual output pulses is a measure of torque but is subject to error from interfering fields which may be unknown and unpredictable. Considering first D.C. or unipolarfields, they may result in an unknown level of the quiescent field V.sub.Q detected by sensor 218' on which the torque-dependent signal V.sub.T is superposed. Thus a measurement of the peak value of a single output pulse of the signal V.sub.T is error prone. An improved measurement of torque acting to cancel any D.C. interference component is obtained by making a V.sub.pp peak-to-peak measurement V.sub.pp between successive output pulses of opposite polarity, e.g. V.sub.T1–V.sub.T2. It will be appreciated that this peak-to-peak measurement technique enables a single sensor device in a single location to be used without interference from fields such as the Earth's magnetic field.

Heretofore, cancellation of the Earth's field has required at least two sensor devices. A second step directed towards excluding local noise spikes that may occur is to gate the peak measurements in synchronism with the applied current waveform so that the peak measurement gate $t.sub.g$ is only opened for a period, in which each torque-signal output pulse is expected. Another way of approaching the same problem is to have a phase-sensitive detection arrangement synchronized to the drive current waveform.

FIG. 18 shows a block diagram of a processing circuit for the sensor output signals $V.sub.T$. The sensor device 218 (218') is connected to a signal conditioner circuit 230 which produces the torque-dependent output signals $V.sub.T$ (FIG. 15$b$). This output is fed to a gate circuit 232 controlled by frequency source 221 (including control derived from the coil drive current waveform). The gate opens at the times $t.sub.g$ related to the drive pulses at which a torque-dependent output pulse is expected. The pulses passed by gate 232 are applied to a peak-to-peak detector 234 whose torque-dependent peak-to-peak output $V.sub.PP$ is used as the wanted torque-output signal, subject to any smoothing or other processing required.

The gating technique assists in discrimination against random magnetic noise spikes. It will also be understood that by selection of the frequency of operation of the source 220, e.g. bridge 224, additional discrimination can be obtained against noise related to the local power (mains) frequency.

One particular application for the invention is for a torque wrench adaptor acting between the shaft of a power torque tool and a nut or bolt head to be tightened 29 or loosened). Such an adaptor is shown in FIG. 19. The adaptor 240 has an upper circular cylindrical body 242 having a shaped input recess 244 for receiving a matching keyed output shaft of a power tool. Descending from body 242 is a reduced diameter body 246 in the form of a short shaft terminating at its lower end in a key 248 to engage a matching nut or bolt head. The adaptor is received in a housing 250 which allows little room to receive magnetic field sensor devices. It is of major concern in many assembly industries to be able to measure the torque actually exerted by the adaptor 240 on the nut or bolt with which it is engaged. The adaptor will normally receive a series of impulses of increasing torque from the power tool and, particularly in the case of impact-action power tools, the nature of the successive impacts may be deleterious to a magnetic-based, torque transducer assembly fitted around a region of the shaft 246 relying on stored magnetism and used as a transducer element. Apart from the violent shocks to which the adaptor is subject, there is always the possibility of interfering magnetic fields being set up through the adaptor between the power tool and the product on which it acts as well as a generally noisy environment particularly related to mains power.

It is thus considered that the present invention may be used advantageously in such a hostile environment by applying the teachings described above to the shaft body 246 to measure the torque therein. Furthermore a transducer assembly embodying the invention can be assembled in the restricted space available. The coils would about the shaft 246 require little space external to the shaft. The sensor arrangement requires only one sensor device and that may be located within the profile of shaft 246 by adopting the arrangement of FIG. 13$b$.

The ability to operate with a single tangentially-oriented sensor device does not preclude the adoption of multiple such sensor devices where circumstances warrant. There is still advantage to be gained in canceling out any "D.C." magnetic fields by using a pair of sensor devices located and connected additively as regards the torque to be, measured but in opposition as regards an interference field to be cancelled Such sensor arrangements are discussed in the prior art referred to above.

The transducer assembly of the invention, has been described thus far with reference to a transducer element defined between a pair of coils, as shown in FIGS. 13 to 19. As is described above with reference to FIGS. 1 to 12, a tangential or circumferentially-directed, torque-dependent magnetic field component can be obtained with a single coil. FIG. 20 shows the principle of such an assembly. A transducer region 216' of a shaft 210 is defined by the position of a single coil 212'. Energization (I) of the coil creates an axially-directed field in the region 216' with an accompanying external longitudinal field 217 which extends in an annulus about the shaft. When the shaft is subject to torque, a tangential or circumferentially-directed component arises which is detectable by a tangentially oriented sensor 218". The sensor is mounted very close in to the coil in this case to be within the field generated by the coil. It may be housed within the profile of the shaft as in FIGS. 14$a$ and 14$b$.

As is more fully described with reference to FIGS. 1 to 12, the transducer assembly of FIG. 20 may also be applied to the measurement of a tilt or skew of the axis A—A of the shaft relative to the axis of the coil due to an applied force acting to tilt or skew the axis of the shaft, or other elongate member, as indicated in dotted line by arrows FF.

FIG. 20 also shows the possibility of using a second, axially-oriented, sensor device or devices 219 for detecting the external axially-directed component of the longitudinal magnetization. This feature may be also employed with the earlier described two coil embodiment. Such a sensor device(s) can be used to provide a reference signal representing the field strength generated by the coil or coils. The wanted peak-to-peak signal can be measured or calibrated against the reference level. The reference level can be used to control the gain factor of the transfer function of the transducer.

The invention claimed is:

1. A method for measuring torque acting on a member in which at least one coil, wound about an axis of the member about which axis torque is applied, is A.C. energized to create an alternating polarity magnetic field in the member which field emanates a component dependent on torque, and in which a magnetic field sensor arrangement is responsive to the emanated component to produce a torque-indicating signal, wherein the at least one coil is energized by a series of energizing pulses of current of alternating polarity, the sensor arrangement produces sensor pulses of alternating polarity corresponding to said energizing pulses, and the sensor pulses are measured in a peak-to-peak fashion to produce an output signal representing the applied torque.

2. A method as claimed in claim 1 in which said energizing pulses are generated by differentiating a switched waveform, wherein said switched waveform is a rectangular or a square waveform.

3. A method as claimed in claim 2 in which the switched waveform is applied to the at least one coil through a capacitor.

4. A method as claimed in claim 1 in which the series of energizing pulses is generated by a switching bridge circuit to an input diagonal of which a D.C. input is applied and to an output diagonal of which said at least one coil is connected to receive an A.C. waveform due to the switching of the bridge circuit.

5. A method as claimed in claim 4 in which the circuit path through which said at least one coil is energized includes a series capacitor.

6. A method as claimed in claim 5 in which the series capacitor is connected in series with said at least one coil to said output diagonal.

7. A method as claimed in claim 1 in which said at least one coil comprises a first and second axially-spaced coils between which a transducer region of the member is defined.

8. A method as claimed in claim 7 in which the first and second coils are connected in series to additively create an axially-directed magnetic field in said transducer region.

9. A method as claimed in claim 1 in which said sensor arrangement comprises a sensor device oriented to detect a tangentially or circumferentially-directed component of magnetic field.

10. A method as claimed in claim 9 in which said sensor arrangement comprises a single sensor device acting at a single location for detection of a tangential or circumferentially-directed component of magnetic field.

11. A method as claimed in claim 7 in which said sensor arrangement comprises a sensor device disposed externally to the body profile of the member.

12. A method as claimed in claim 7 in which said sensor arrangement comprises a sensor device disposed in a notch, recess or bore in the member so as to be disposed substantially internally of the body profile of the member.

13. A method as claimed in claim 11 in which said sensor arrangement comprises a single sensor device acting at a single location and oriented to detect a tangential or circumferentially-directed component of magnetic field.

14. Apparatus for measuring torque acting on a member about an axis of which torque is applied, comprising:
- at least one coil wound about said axis of said member;
- energizing means for energizing said at least one coil with alternating current to create an alternating polarity magnetic field in said member which field emanates a component dependent on torque in the member, and
- signal processing means including a magnetic field sensor arrangement responsive to the emanated component to produce a torque-indicative signal;
- wherein
- said energizing means is operable to generate a series of current pulses of alternating polarity in said at least one coil, and
- said sensor arrangement is operable to provide a series of torque-dependent signal pulses of alternating polarity corresponding to said series of current pulses; and
- said signal processing means comprises a peak-to-peak detector responsive to said series of signal pulses to produce a torque-representing output signal dependent on the peak-to-peak value of said series of signal pulses.

15. Apparatus as claimed in claim 14 in which said energizing means comprises means for generating a switched waveform, such as a rectangular or a square waveform from a D.C. source and means for differentiating said waveform for application to said at least one coil.

16. Apparatus as claimed in claim 15 in which said means for differentiating comprising a capacitor in series with the circuit path through which said at least one coil is energized.

17. Apparatus as claimed in claim 14 in which said means for generating a switched waveform comprises a full-wave bridge circuit having a controlled switch in each arm thereof, said at least one coil being connected across one diagonal of the bridge circuit across the other diagonal of which a source of energizing current is connectable.

18. Apparatus as claimed in claim 14 in which said energizing means comprises a full-wave switching bridge having a controlled switch in each arm of the bridge, said at least one coil being connected in series with a capacitor across one diagonal of the bridge across the other diagonal of which a source of energizing current is connectable.

19. Apparatus as claimed in claim 14 in which said at least one coil comprises first and second axially-spaced coils between which a transducer region of the member is defined.

20. Apparatus as claimed in claim 19 in which the first and second coils are connected in series to additively create an axially-directed magnetic field in said transducer region.

21. Apparatus as claimed in claim 14 in which said sensor arrangement comprises a sensor device oriented to detect a tangential or circumferentially-directed component of magnetic field.

22. Apparatus as claimed in claim 2 in which said sensor arrangement comprises a single sensor device acting at a single location for detection of a tangential or circumferentially-directed component of magnetic field.

23. Apparatus as claimed in claim 21 in which said sensor arrangement comprises a sensor device disposed externally to the body profile of the member.

24. Apparatus as claimed in claim 21 in which said sensor arrangement comprises a sensor device disposed in a notch, recess or bore in the member so as to be disposed substantially internally of the member.

25. Apparatus as claimed in claim 23 in which a sensor device is a single sensor device acting at a single location to detect a tangential or circumferentially directed component of magnetic field.

26. An apparatus as claimed in claim 14 in which said at least one coil comprises a single coil and the sensor arrangement is disposed in close proximity to one end of the single coil and is oriented to be responsive to a tangential or circumferentially directed component of magnetic field.

27. A method of measuring torque in a shaft or other rotating body rotating in a shaft-like manner by means of a transducer comprising:
- said shaft or shaft-like rotating body mounted for the application thereto of torque about a longitudinal axis of the shaft, at least a region of said shaft being of ferromagnetic material;
- a coil mounted about said region and energizable to induce an axially-directed magnetization in said region; and
- a sensor arrangement comprising at least one sensor device mounted adjacent said coil and said region, said sensor device being oriented to detect a tangentially or a circumferentially directed component of magnetic field external to said region, in which method;
- the coil is energized by a series of energizing pulses of current of alternating polarity,
- the sensor arrangement produces sensor pulses of alternating polarity corresponding to said energizing pulses, and
- the sensor pulses are measured in a peak-to-peak fashion to produce an output signal representing torque.

28. A method of measuring a force applied to an elongate member by means of a transducer comprising:
- an elongate member mounted for the application thereto of a force causing the elongate member to tilt or skew angularly about a longitudinal axis thereof;
- the elongate member having at least a region of ferromagnetic material in which the tilt or skew is evinced;
- a coil mounted about said region and energisable to induce an axially-directed magnetization in said region;

a sensor arrangement comprising at least one sensor device mounted adjacent said coil and said region, said sensor device being oriented to detect a tangentially or a circumferentially directed component of magnetic field external to said region, in which method:

the coil is energized by a series of energizing pulses of current of alternating polarity, the sensor arrangement produces sensor pulses of alternating polarity corresponding to said energizing pulses, and the sensor pulses are measured in a peak-to-peak fashion to produce an output signal representing torque.

29. A method as claimed in claim 27 in which said coil and said at least one sensor device are comprised in a unitary transducer assembly.

30. A method as claimed in claim 28, in which said energizing pulses are generated by differentiating a switched waveform, wherein said switched waveform is a rectangular or a square waveform.

31. A method as claimed in claim 30 in which the switched waveform is applied to the at least one coil through a capacitor.

32. A method as claimed in claim 27, in which the series of energizing pulses is generated by a switching bridge circuit to an input diagonal of which a D.C. input is applied and to an output diagonal of which said at least one coil is connected to receive an A.C. waveform due to the switching of the bridge circuit.

33. A method as claimed in claim 32 in which the circuit path through which said at least one coil is energized includes a series capacitor.

34. A method as claimed in claim 33 in which the series capacitor is connected in series with said at least one coil to said output diagonal.

35. A transducer assembly comprising:

a coil wound about an axis and having an axial hollow therethrough, said coil being energisable to generate an axially-directed magnetic field in a ferromagnetic portion of a shaft or other elongate member receivable in said hollow;

energizing means for energizing said coil with alternating current to create an alternating polarity magnetic field in said member which field emanates a component dependent on torque in the member, said energizing means being operable to generate a series of current pulses of alternating polarity in said coil, and a sensor arrangement comprising at least:one sensor device disposed adjacent an end of said coil and said hollow for detecting a magnetic field component associated with a portion of ferromagnetic material received in said hollow, said sensor device being oriented to detect a magnetic field component in a tangential or a circumferential direction with respect to said axis, said sensor arrangement being operable to provide a series of torque-dependent signal pulses of alternating polarity corresponding to said series of current pulses; and signal processing means comprising a peak-to-peak detector responsive to said series of signal pulses to produce a torque-representing output signal dependent on the peak-to-peak value of said series of signal pulses.

36. A transducer assembly as claimed in claim 35 in which said energizing means comprises means for generating a switched waveform, wherein said switched waveform is a rectangular or a square waveform from a D.C. source and means for differentiating said waveform for application to said at least one coil.

37. A transducer assembly as claimed in claim 36 in which said means for differentiating comprises a capacitor in series with the circuit path through which said coil is energized.

38. A transducer assembly as claimed in claim 35, in which said means for generating a switched waveform comprises a full-wave bridge circuit having a controlled switch in each arm thereof, said coil being connected across one diagonal of the bridge circuit across the other diagonal of which a source of energizing current is connectable.

39. A transducer assembly as claimed in claim 35 in which said energizing means comprises a full-wave switching bridge having a controlled switch in each arm of the bridge, said coil being connected in series with a capacitor across one diagonal of the bridge across the other diagonal of which a source of energizing current is connectable.

40. A transducer assembly as claimed in claim 35 in which said coil and said at least one sensor are a unitary assembly.

41. A method according to claim 1, wherein said member is mounted for the application thereto of torque about a longitudinal axis of the member, at least a region of said member being of ferromagnetic material;

the at least one coil is mounted about said region and energizable to induce an axially-directed magnetization in said region; and the sensor arrangement comprises at least one sensor device mounted adjacent said coil and said region, said sensor device being oriented to detect a tangentially or a circumferentially directed component of magnetic field external to said region.

42. An apparatus according to claim 14, wherein said member is mounted for the application thereto of torque about a longitudinal axis of the member, at least a region of said member being of ferromagnetic material;

the at least one coil is mounted about said region and energizable to induce an axially-directed magnetization in said region; and the sensor arrangement comprises at least one sensor device mounted adjacent said coil and said region, said sensor device being oriented to detect a tangentially or a circumferentially directed component of magnetic field external to said region.

43. A method according to claim 1, wherein said sensor arrangement comprises first and second sensor devices each having a respective axis of maximum sensitivity for detection of a magnetic field, said first and second sensor devices being arranged to have their respective axes of maximum sensitivity at an angle to one another for providing a combined axis of response which lies within, and preferably bisects, said angle.

44. An apparatus according to claim 14 wherein said sensor arrangement comprises first and second sensor devices each having a respective axis of maximum sensitivity for detection of a magnetic field, said first and second sensor devices being arranged to have their respective axes of maximum sensitivity at an angle to one another for providing a combined axis of response which lies within, and preferably bisects, said angle.

45. A transducer assembly according to claim 35 wherein said sensor arrangement comprises first and second sensor devices each having a respective axis of maximum sensitivity for detection of a magnetic field, said first and second sensor devices being arranged to have their respective axes of maximum sensitivity at an angle to one another for providing a combined axis of response which lies within, and preferably bisects, said angle.

46. A method according to claim 1, wherein said at least one coil has a respective further coil axially to each side thereof and connected to be energized to produce a magnetic field of opposite polarity to that of said at least one coil about the transducer region.

47. Apparatus according to claim 14 wherein said at least one coil has a respective further coil axially to each side thereof and connected to be energized to produce a magnetic field of opposite polarity to that of said at least one coil about the transducer region.

48. A transducer assembly according to claim 35 wherein said at least one coil has a respective further coil axially to each side thereof and connected to be energized to produce a magnetic field of opposite polarity to that of said at least one coil about the transducer region.

49. A method according to claim 46, further comprising disposing first and second further coils each wound about an axis coaxial with the first-mentioned coil and having an axial hollow therethrough in alignment along a common axis with the first-mentioned coil between and spaced from said first and second further coils to receive a ferromagnetic portion of a shaft or other elongate member to extend through all three coils.

50. Apparatus according to claim 47, further comprising first and second further coils each wound about an axis coaxial with the first-mentioned coil and having an axial hollow therethrough, the said at least one coil and said first and second further coils being disposed in alignment along a common axis with the first-mentioned coil between and spaced from said first and second further coils to receive a ferromagnetic portion of a shaft or other elongate member to extend through all three coils.

51. A transducer assembly according to claim 48, further comprising first and second further coils each wound about an axis coaxial with the first-mentioned coil a and having an axial hollow therethrough, the said at least one coil and said first and second further coils being disposed in alignment along a common axis with the first-mentioned coil between and spaced from said first and second further coils to receive a ferromagnetic portion of as haft or other elongate member to extend through all three coils.

52. A transducer assembly as claimed in claim 51 in which said at least one coil and said first and second further coils are connected in series such that said first and second further coils are energizable to generate magnetic fields of opposite polarity to that generated by the said at least one coil.

53. Apparatus according to claim 50 in which said at least one coil and said first and second further coils are connected in series such that said first and second further coils are energizable to generate magnetic fields of opposite polarity to that generated by the said at least one coil.

54. A method according to claim 49 in which said at least one coil and said first and second further coils are connected in series such that said first and second further coils are energizable to generate magnetic fields of opposite polarity to that generated by the said at least one coil.

* * * * *